United States Patent [19]

Yamazaki et al.

[11] Patent Number: 5,266,788

[45] Date of Patent: Nov. 30, 1993

[54] LASER SCANNER FOR BAR CODE READER HAVING A TRANSPARENT LIGHT GUIDE PLATE

[75] Inventors: Kozo Yamazaki, Hadano; Hiroyuki Ikeda, Yokohama; Fumio Yamagishi, Ebina; Hirokazu Aritake, Isehara; Masanori Ohkawa, Atsugi, all of Japan

[73] Assignee: Fujitsu Limited, Kawasaki, Japan

[21] Appl. No.: 700,170

[22] PCT Filed: Sep. 14, 1990

[86] PCT No.: PCT/JP90/01181

§ 371 Date: Jul. 16, 1991

§ 102(e) Date: Jul. 16, 1991

[87] PCT Pub. No.: WO91/04550

PCT Pub. Date: Apr. 4, 1991

[30] Foreign Application Priority Data

Sep. 18, 1989 [JP] Japan .................. 1-240123
Sep. 18, 1989 [JP] Japan .................. 1-240124
Sep. 18, 1989 [JP] Japan .................. 1-240130
Sep. 18, 1989 [JP] Japan .................. 1-240137
Sep. 20, 1989 [JP] Japan .................. 1-244361

[51] Int. Cl.$^5$ .............................................. G06K 7/10
[52] U.S. Cl. .................................. 235/467; 235/473; 235/457
[58] Field of Search ............ 235/462, 467, 473, 457, 235/459

[56] References Cited

U.S. PATENT DOCUMENTS

| | | |
|---|---|---|
| 3,643,068 | 2/1972 | Mohan et al. ................ 235/467 |
| 4,009,369 | 2/1977 | Hayosh et al. ............... 235/467 |
| 4,093,865 | 6/1978 | Nickl .......................... 235/470 |
| 4,297,653 | 10/1981 | Scifres et al. ............... 357/19 |
| 4,398,792 | 8/1983 | Horner et al. ............... 350/96.19 |
| 4,591,236 | 5/1986 | Broockman et al. ........ 235/457 |
| 5,042,821 | 8/1991 | Bontly ........................ 235/462 |
| 5,105,070 | 4/1992 | Wike, Jr. et al. ............ 235/467 |
| 5,184,004 | 2/1993 | Ueda et al. ................. 234/462 |
| 5,225,122 | 5/1992 | Jwo et al. ................... 235/467 |

FOREIGN PATENT DOCUMENTS

| | | |
|---|---|---|
| 0036781 | 9/1981 | European Pat. Off. . |
| 0363035 | 4/1990 | European Pat. Off. . |
| 2376424 | 11/1977 | France . |
| 62-243081 | 10/1987 | Japan . |
| 62-24046 | 8/1988 | Japan . |
| 1-95377 | 4/1989 | Japan . |
| 88/03686 | 5/1988 | PCT Int'l Appl. . |

Primary Examiner—Donald T. Hajec
Assistant Examiner—Esther Chin
Attorney, Agent, or Firm—Staas & Halsey

[57] ABSTRACT

A laser scanner for a bar code reader has a laser source (41), a laser beam scanning means (31, etc.,) for scanning a bar code (B) on an object in a predetermined direction with a laser beam emitted from the laser source, a light emission window (25) for emitting the scanning beam toward the bar code on the object, and an optical detecting means (51) for detecting signal light reflected from the bar code. The laser beam scanning means and optical detecting means are integrally incorporated in a single substrate (20), and the light emission window is supported on the substrate by a transparent support (23, etc.).

28 Claims, 18 Drawing Sheets

CUSTOMER        OPERATOR

LASER SCANNER FOR BAR CODE READER HAVING A TRANSPARENT LIGHT GUIDE PLATE

FIELD OF THE INVENTION

The present invention relates to a laser scanner for reading bar codes in a POS system for registers used at, for example, supermarkets, department stores, and other specialty stores.

STATE OF THE PRIOR ART

Laser scanners (POS systems) are extensively used at supermarkets, department stores, and other specialty stores. These stores usually use a stand-type laser scanner, as it is relatively small and occupies little space.

Namely, the stand-type laser scanner is compact and takes up little space, and thus is suitable for a small store having only a small space for a check-out counter.

As shown in FIGS. 33 and 34, a conventional stand-type scanner has a scanning optical system incorporated in a support unit 5 protruding from a substrate (a base plate) 6 arranged on a counter 9. This arrangement usually increases the size of the support unit, and accordingly the size of the scanner as a whole, and spoils the appearance thereof. Since the arrangement is made mainly from the viewpoint of an easy observation by an operator A, a support 7 blocks the sight of a customer B, who therefore cannot clearly see a bar code 10 on a commodity 8. Namely, the conventional stand-type laser scanner is not transparent and is located between the customer and the operator, and thus the customer cannot see or read the bar code on the commodity through the stand-type laser scanner and must shift his or her position to see the bar code. In the figures, P denotes a scanning beam emitted in the direction of an arrow mark.

FIG. 35 shows a typical check-out counter according to the prior art. Generally, there are three (indicated by (1), (2), and (3)) commodity price display units, respectively arranged on a keyboard 2, above a bar code reading portion 4 and on a POS register portion 3.

It is impossible for a customer, however, to simultaneously observe any one of the displays and a bar code of a commodity (which is passed over the reading portion 4) handled by an operator. Namely, if the customer wishes to confirm the bar code reading operation as well as the displayed price, the customer must shift his or her position alternately to see them.

DISCLOSURE OF THE INVENTION

An object of the invention is to provide a laser scanner for a bar code reader having a reduced size and enabling a customer to easily observe a bar code reading operation.

To achieve the above object, a laser scanner for a bar code reader according to the present invention comprises a laser source, a laser beam scanning means, for scanning a bar code on an object in a predetermined direction with a laser beam emitted from the laser source, a light emission window for emitting the scanning beam toward the bar code on the object, and an optical detecting means for detecting a signal light reflected from the bar code. The laser beam scanning means and optical detecting means are integrally incorporated in a substrate, and the light emission window is supported by a transparent support disposed on and protruding from the substrate.

It is preferable to integrally incorporate the laser source in the substrate.

The transparent support may be a light guide plate for propagating outgoing light and returning signal light, or a simple support frame. If a light guide plate is used, the outgoing light and returning signal light repeat a total reflection and are propagated in the light guide plate. If a support frame is used, the outgoing light and returning signal light are propagated in the air.

It is preferable to form one or a plurality of holograms on the light emission window thereby, to diffract the laser beam in a predetermined direction.

The laser beam scanning means may be either a galvanomirror or a rotatable polygonal mirror.

According to another embodiment of the invention, the light guide plate has a reflection hologram, for reflecting light having a predetermined wavelength in a predetermined direction. On the opposite side of the light emission window and behind the light guide plate, an indicator is arranged to indicate information represented by light having a wavelength which is substantially identical to the above-mentioned wavelength. The hologram reflects the information light from the indicator in the predetermined direction.

The wavelength of the laser beam differs from the information light of the indicator.

Preferably, the light guide plate is removably fitted to the substrate.

According to still another embodiment of the invention, there is provided a laser beam dividing means for dividing an outgoing laser beam from the laser source into a plurality of laser beams that are made incident on respective holograms of the light emission window. The laser beam dividing means is preferably composed of a plurality of reflection type holograms.

The laser source may be a semiconductor laser.

The scanning beam from the scanning optical system incorporated in the substrate is propagated in the transparent light guide plate or in the air and is externally emitted from an outgoing portion, in a predetermined direction. The light guide plate or the support frame corresponding to the post of the prior art is transparent, and does not spoil the appearance of the scanner. In addition, the light guide plate or the support frame does not incorporate the scanning optical system, and thus the scanner is compact. A customer can easily observe and confirm a bar code leading operation through the transparent light guide plate or the transparent support frame.

When the scanning beam outgoing portion is a hologram, a diffracting direction of the portion can be optionally designed, and by controlling a scanning direction, a bar code can be easily read.

DETAILED DESCRIPTION OF THE INVENTION

The embodiments of the present invention will be explained.

Figure 1:
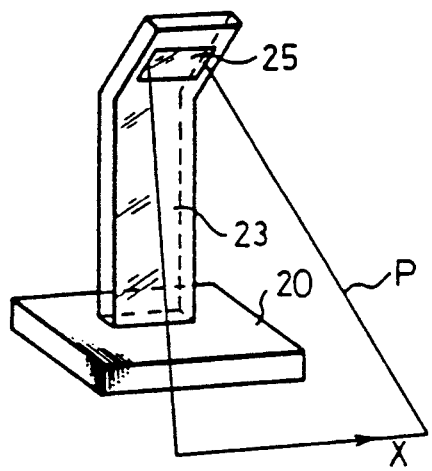
FIG. 1 is a perspective view showing a basic arrangement of a laser scanner according to the present invention.
Figure 2:
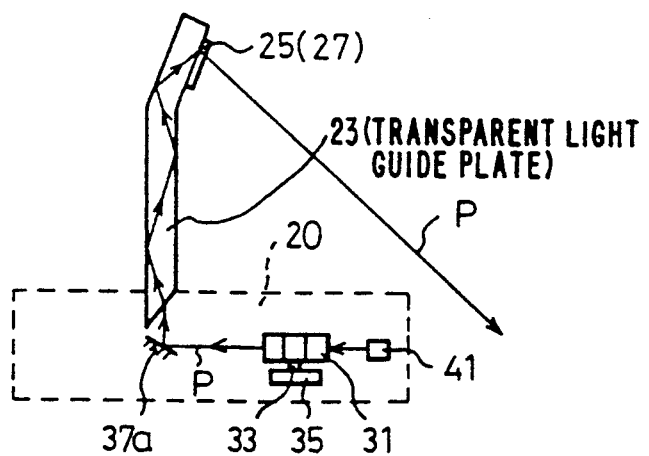
FIG. 2 is a side view showing an inside arrangement of FIG. 1.
Figure 34:
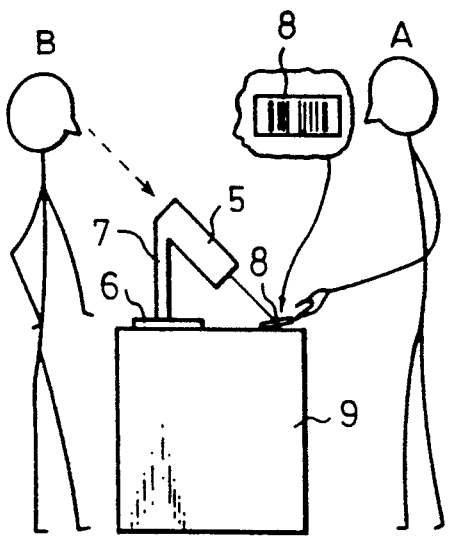
FIG. 34 is an illustration of a check-out counter employing the stand type laser scanner of the prior art.
Figure 35:
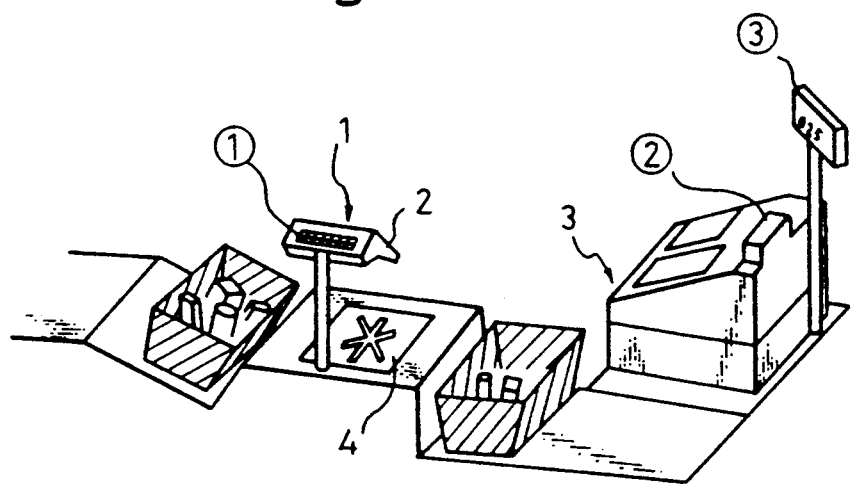
FIG. 35 is a general illustration of a check-out counter of the prior art.

FIGS. 1 and 2 show a basic arrangement of a stand type laser scanner according to an embodiment of the present invention. A transparent light guide plate 23 is integrally formed on a substrate 20, and a scanning beam emission window 25 is formed at an upper part of the light guide plate 23. According to the embodiment shown, the emission window 25 is formed from a hologram 27. The transparent light guide plate 23 serves to support the emission window 25. When the scanner is particularly intended to be used at a register counter of a supermarket, etc., the upper part of the light guide plate may be angled toward the side of the operator as shown in the figures, so that a scanning beam P always irradiates a bar code (B in FIG. 34) of a commodity 8. As shown in FIG. 2, the substrate 20 incorporates a scanning optical system for the scanning beam P. This scanning optical system has, for example, a polygonal mirror (rotatable polygonal mirror) 31 known per se, which is rotated around a rotary shaft 33 by a motor 35. In response to the rotation, the polygonal mirror 31 guides the beam P in a plane within the substrate 20 so that the beam is reflected upward from a lower mirror 37a into the transparent light guide plate 23. The scanning beam undergoes repeated total reflections inside the transparent light guide plate 23 and, as shown in the figures, is diffracted by the hologram 27 in a predetermined direction and emitted from the emission window 25. The emitting direction is optionally set according to the design of a desired pitch of interference fringes, etc., of the hologram 27. A light source of the scanning beam P is, for example, a semiconductor laser 41 (FIG. 2). The beam is made incident on the polygonal mirror 31 from, for example, the inside of the substrate 20.

This embodiment is characterized in that the light guide plate 23 forming the support of the emission window 25 is transparent, and that optical systems (the scanning optical system, etc.), except for the emission window 25, are integrally incorporated inside the substrate 20.

Figure 3:
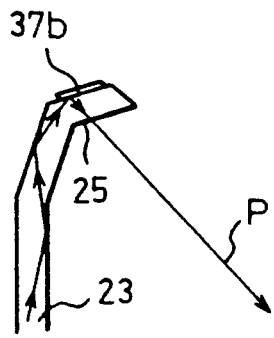
FIG. 3 is a partial view showing another embodiment of a scanning beam outgoing portion of FIG. 2.

FIG. 3 shows another embodiment of the invention. In the figure, a reflection mirror 37b is fitted to an upper part of the transparent light guide plate 23, and the reflection mirror 37b reflects the scanning beam P out through the emission window 25. In this case, the hologram 27 is not needed at the emission window 25. The reflection mirror 37b is fixed to the upper end, on the surface thereof opposite to the surface thereof disposed toward the commodity, of the transparent light guide plate 23 by adhesion or vapor deposition.

Figure 4:
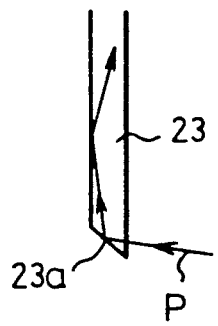
FIG. 4 is a partial view showing another embodiment of a scanning beam incident portion of FIG. 2.

FIG. 4 shows still another embodiment of the invention. In the figure, a lower end face 23a of the transparent light guide 23 is obliquely cut. Without the lower reflection mirror 37a of FIG. 2, the lower end face 23a directly totally reflects a scanning beam upwardly into the transparent light guide plate 23.

Figure 5:
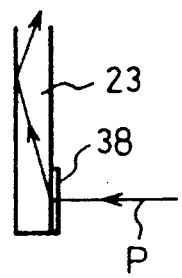
FIG. 5 is a view showing still another embodiment of FIG. 4.

As shown in FIG. 5, a hologram 38 may be arranged at a lower end portion of the transparent light guide 23. The hologram 38 diffracts the scanning beam P from the polygonal mirror 31 (FIG. 2) in a predetermined direction to guide the beam upwardly into the transparent light guide plate 23.

Figure 6:
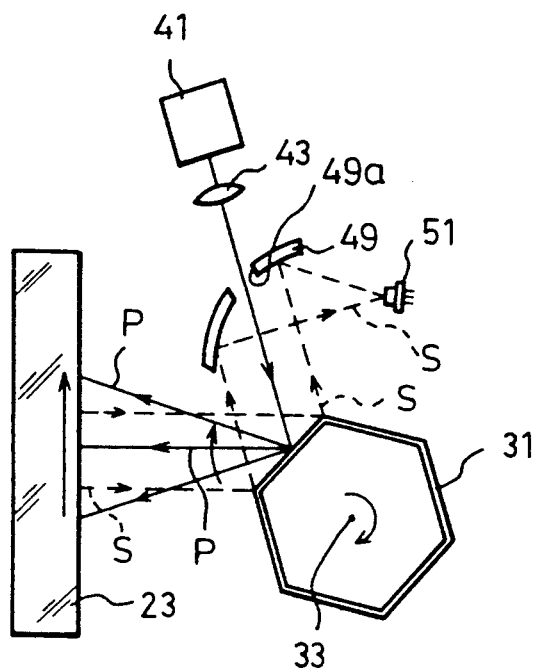
FIG. 6 is a plan view explaining a scanning optical system for reading bar codes according to the present invention.

FIG. 6 shows a laser beam scanning and signal light collecting optical system according to an embodiment of the present invention. In the figure, a laser source 41 (an He-Ne laser or a semiconductor laser) emits a light beam, which is converted by a beam shaping lens 43 into a beam having a predetermined diameter and shape. The beam is incident on the polygonal mirror 31 and, due to the rotation of the polygonal mirror 31 around the shaft 33, the beam becomes the scanning beam P which enters the transparent light guide plate 23. The beam P traces the scanning beam path mentioned before. The beam scanning the bar code B (FIG. 34) of the commodity 8 is accordingly scattered, and part of the scattered light again enters, as signal light S, the transparent light guide plate 23. The signal light S traces the same path as before and returns to the polygonal mirror 31. The signal light S is then reflected by the polygonal mirror 31 and by a concave mirror 49, having a pin-hole 49a (i.e., a light transmitting aperture) therein; and guided to a photodetector 51. The processes carried out after the detection of the signal light by the photodetector 51 are not the object of the invention and are well known, and therefore, a detailed explanation thereof is omitted. The size and position of a pinhole 49a of the holed concave mirror 49 are set so as not to interfere with a beam traveling toward the polygonal mirror 31.

Figure 7:
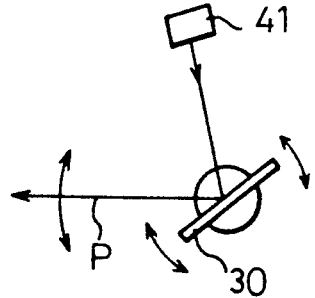
FIG. 7 is a partial view showing a modification of FIG. 6.

As is known, instead of the polygonal mirror 31, it is possible to use a galvano mirror 30 as in of FIG. 7.

Figure 8:
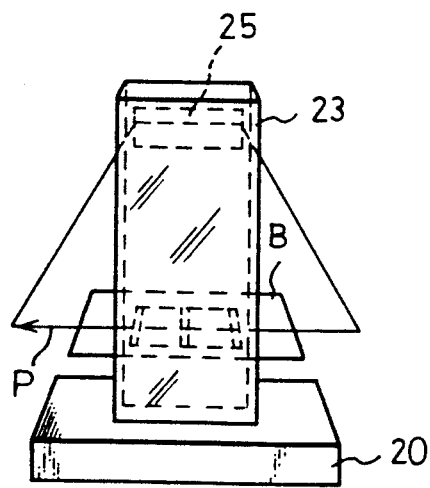
FIG. 8 is a perspective view for explaining the effects of the present invention.

In the above embodiment, the scanning optical system is incorporated in the substrate 20 but not disposed inside the transparent light guide plate 23, and thus the transparent light guide 23 may have a compact design. In addition, as shown in FIG. 8, a customer can easily observe a reading operation of the bar code B from the back of and through the transparent light guide plate 23.

The light source need not be incorporated inside the substrate 20 but can be located outside the substrate, and the outgoing beam from the outside light source then is guided into the substrate.

Figure 9:
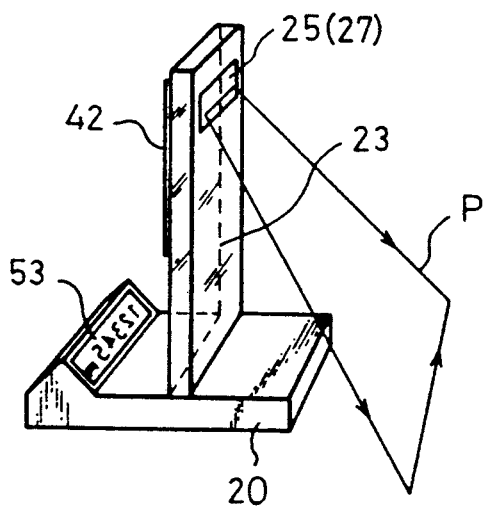
FIG. 9 is a perspective view showing a basic arrangement of a stand type laser scanner according to another embodiment of the present invention.
Figure 10:
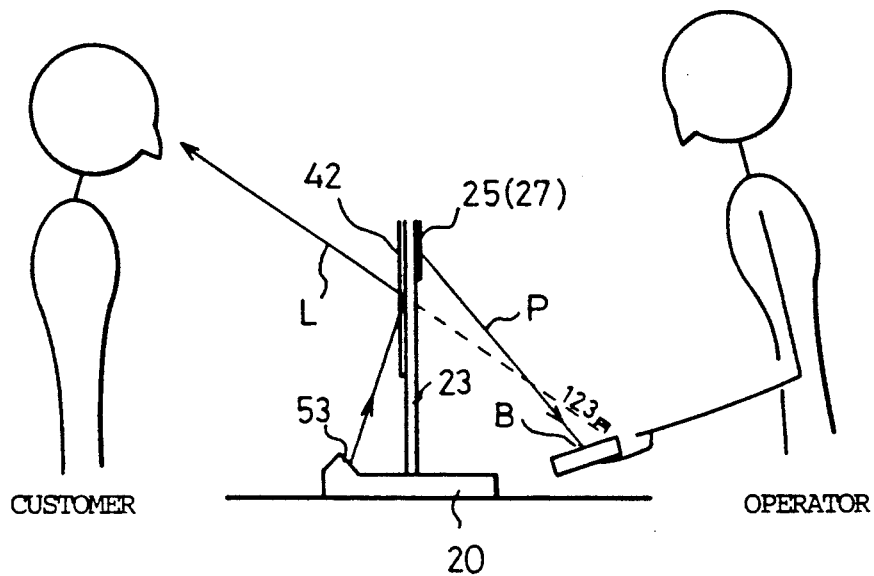
FIG. 10 is a general view, schematically showing a check-out counter for explaining effects of the embodiment of FIG. 9.
Figure 11:
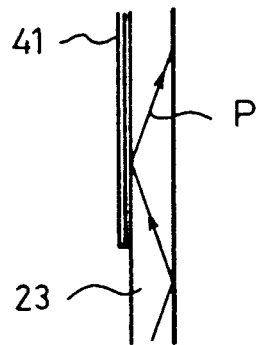
FIG. 11 is an enlarged view showing a reflection type hologram of FIG. 10.

FIGS. 9 to 11 show an embodiment which enables a customer to observe a bar code B of a commodity as well as a price display.

As explained before, the scanning optical system (such as the polygonal mirror 31 and mirror 37a) incorporated inside the substrate 20 provides a scanning beam, which is propagated inside the light guide plate 23 in a parallel path is externally emitted from the emission window 25 in a predetermined direction. Since the support portion is transparent, a customer can observe the bar code during the reading operation but cannot simultaneously observe the corresponding price display. This is because the price display is usually oriented toward the operator, and thus cannot be seen by the customer. According to the embodiment of FIGS. 9 to 11, a display (an indicator) 53 is arranged on the substrate 20 and oriented toward the operator, but information displayed on the display can be seen by a customer positioned behind the display.

FIGS. 9, 10, and 11 show a basic arrangement of this stand type laser scanner according to the embodiment of the invention. In the figures, a transparent light guide 23 is fitted on a substrate 20. A scanning beam emission window 25 comprising a hologram 27 is fitted to an upper part of the light guide plate. The substrate 20 incorporates a scanning optical system having a polygonal mirror 31 rotated by a motor 35 (FIG. 2). Due to the rotation, the polygonal mirror 31 guides a beam in a plane within the substrate 20. The beam is guided by a reflection mirror 37a (FIG. 2) upwardly into the transparent light guide plate 23. The scanning beam inside the transparent light guide plate 23 rundergoes repeated total reflections, and as shown in the figures, is diffracted by and emitted from the emission window (hologram) 25 in a predetermined direction thereby to irradiate a bar code. These arrangements are the same as those of the embodiment shown in FIGS. 1 to 8.

According to this embodiment, a reflection type hologram 42 is formed at the back thereof, i.e., the customer's side opposite to the emission window 25. A price indicator (display) 53 is integrally and obliquely arranged on the substrate 20 on the same side as the reflection type hologram 42, thereby to face the reflection type hologram 42 of the transparent light guide plate 23.

As is known, the reflection type hologram has diffraction characteristics of reflecting light having a specific wavelength, and the diffraction characteristics can be optionally (i.e., selectively) controlled by properly designing the pitch of the hologram (interference fringes), etc.

In accordance with the check-out counter of the abovementioned arrangement, information light L (FIG. 10) from the price indicator 53 is reflected and diffracted by the reflection type hologram 42 in a predetermined direction, so as to be able to be seen by a customer. As a result, the customer can see a virtual image of a price (Yen 123 in the figure) on the indicator 53 as well as a bar code B on a commodity handled by the operator. This principle is the same as the principle of a headup display that overlays information light (corresponding to the price information) over a background (corresponding to the bar code of the commodity).

The color of the information light L of the indicator 53 preferably matches the color, for example, green, of light (having the particular wavelength) reflected from the reflection type hologram 42.

As shown in FIG. 10, the scanning beam P propagated in the transparent light guide plate 23 also enters the reflection type hologram 42 for the indicator. If the wavelength of the scanning beam P is selected to be different (for example, red) from the selected wavelength of the reflection type hologram 42, it will not be affected by the reflection type hologram 42. Namely, as if the reflection type hologram 42 were omitted, the scanning beam is propagated upward by a repetitive total reflection in the transparent light guide plate 23.

The hologram 42 may be formed on either side of the light guide plate.

As explained above, the price information light L from the indicator 53 is reflected and diffracted by the reflection type hologram 42 in a predetermined direction, so that a virtual image of the information substantially overlaps a bar code of a commodity positioned behind the transparent light guide plate 23. Namely, as in the headup display, a customer can observe the bar code as well as the price information light, one upon the other, without shifting position.

FIGS. 12 to 17B show embodiments which read a bar code B by using a plurality of crossing scanning line patterns.

To clearly read a bar code on a commodity in a POS system, it is preferable to use scanning line patterns that cross and are oriented in at least two directions. If only one scanning line is used, the scanning line may not impinge on the bar code, depending on the orientation of the commodity (bar code) handled by an operator, and as a result, the bar code cannot be read. This frequently happens when the bar code is small. For a very small bar code, at least three to five multidirectional crossing patterns are needed.

The embodiments shown in FIGS. 1 to 11 basically employ a single (unidirectional) scanning line.

Figure 12:
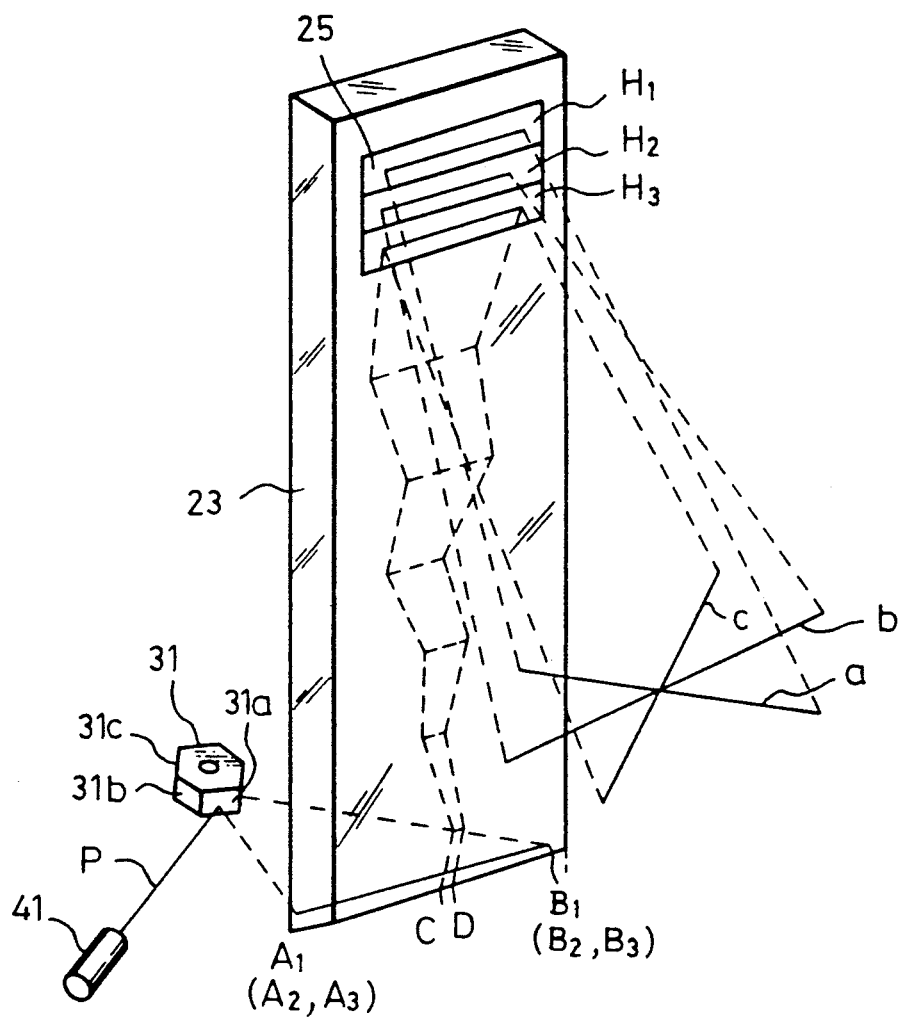
FIG. 12 is a perspective view showing a principle of a laser scanner according to still another embodiment of the present invention.
Figure 13:
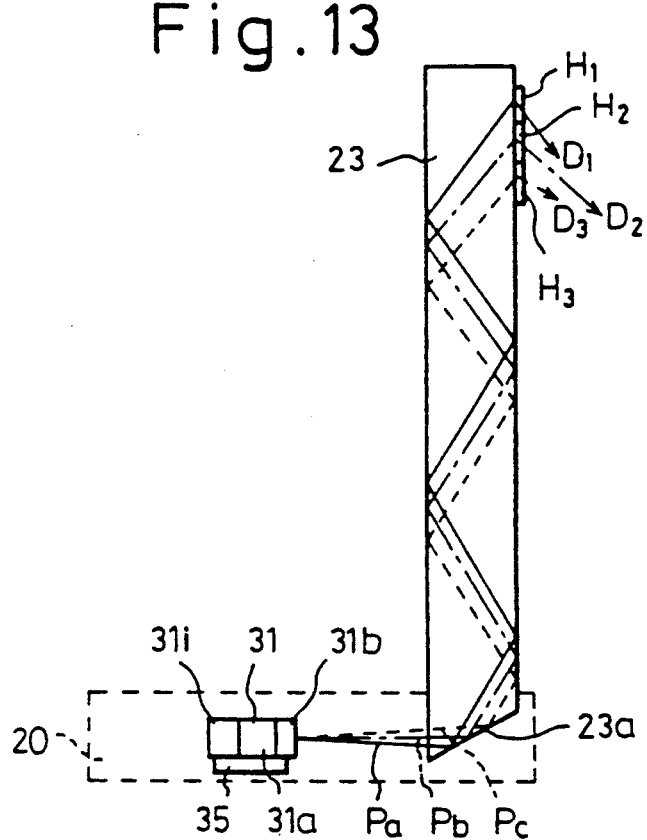
FIG. 13 is a side view showing an inside arrangement of FIG. 12.

FIGS. 12 and 13 show an embodiment of a stand type laser scanner employing multiple scanning lines. In the figures, a transparent light guide plate 23 is integrally formed on a substrate 20 (FIG. 13), and a scanning beam emission window 25 is formed at an upper part of the light guide plate. The emission window 25 has a plurality of holograms H1, H2, and H3 arranged vertically on a substantially vertical plane. The substrate 20 incorporates a scanning optical system having a polygonal mirror 31 rotated by a motor 35. Due to the rotation, the polygonal mirror 31 guides a beam in a plane of the substrate 20. The beam is guided upwardly by a lower end face 23a a of the transparent light guide plate 23 into the guide plate. The scanning beam in the transparent light guide plate 23 undergoes repeated total reflections, and as shown in the figures, is diffracted by and emitted from the emission window 25 in predetermined directions. The emission directions can be set by properly designing the pitches of interference fringes of the holograms H1, H2, and H3. In FIG. 12, numeral 41 denotes a semiconductor laser serving as a light source.

The scanning beam from the polygonal mirror 31 is propagated upward in the transparent light guide plate 23 due to the repetitive total reflection. The holograms H1, H2, and H3 receive the coherent scanning beam and emit beams in respective diffraction directions D1, D2, and D3 as shown in FIG. 13. In FIG. 12, the middle hologram H2, for example, does not turn (twist) the scanning direction by diffraction but provides a scanning beam b that is in parallel with the incident scanning beam P. On the other hand, the holograms H1 and H3 provide twisted scanning lines a and c due to the diffraction. Namely, the scanning lines a, b, and c form three scanning line patterns crossing one another. Note, the unidirectional scan (parallel scan) in the transparent light guide plate 23 is converted by the holograms H1, H2, and H3 into the scanning patterns of three directions crossing one another. Just after the holograms, the scanning lines a and c are not twisted sufficiently and substantially in parallel with each other. A bar code reading operation with the stand type scanner is usually carried out, however, by putting a bar code (i.e., on a commodity) on a table so that a region to be read is close to the surface of the table which is spaced from the holograms by a certain distance. The cross pattern scanning method of the invention, therefore, raises no problems in practical use. As mentioned before, the number of scanning lines can be increased infinitely in theory, by increasing the number of holograms, to thereby realize an all-round reading.

The angles of the reflection surfaces 31a, 31b, . . . , 31i of the polygonal mirror 31 may be made slightly different from one another, to separate the scanning beam into plural parallel beams so that coherent incident scanning beams for the respective holograms are easily formed as shown in FIG. 13.

Figure 14:
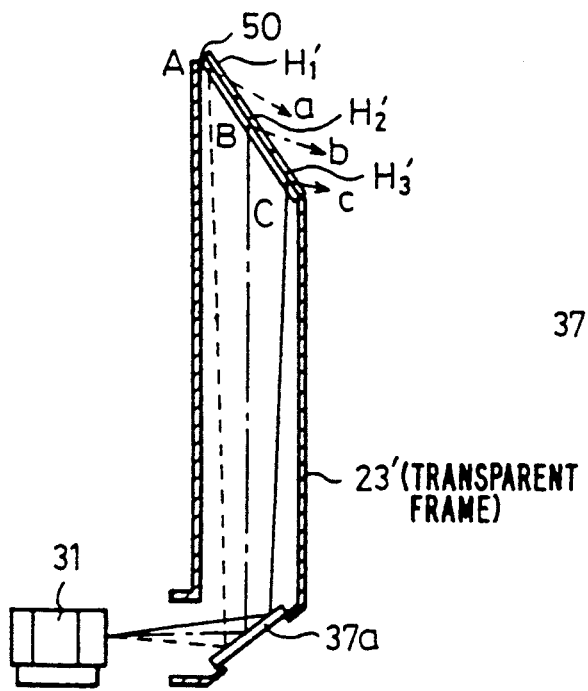
FIG. 14 is a view showing another embodiment different from FIG. 13.

FIG. 14 shows another embodiment of the invention. In the figure, the support is not the transparent light guide plate 23 but a simple transparent frame 23'. The transparent frame separately supports in the air a reflection mirror 37a corresponding to the lower inclined end face 23a of the transparent light guide plate 23 and holograms H1', H2', and H3' corresponding to the holograms H1, H2, and H3. The holograms H1', H2' and H3' are preferably made into a unit on a single glass base 50. The frame 23' is, for example, one or a plurality of transparent plates or bars, or a guide plate having a rectangular cross-sectional shape surrounding the scanning light beam P.

Figure 15:
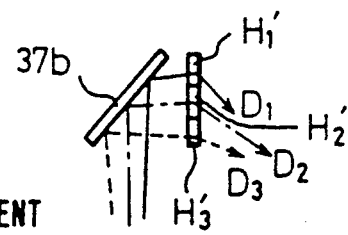
FIG. 15 is a view showing a modification of FIG. 14.

FIG. 15 shows a modification of FIG. 14. Another reflection mirror 37b is disposed in the path of the scanning beams before reaching the holograms H1', H2', and H3' which are arranged substantially on a vertical plane similar to FIG. 13. The holograms H1', H2', and H3' of FIG. 14 are inclined with respect to incident light, to directly receive the incident light.

Figure 16A:
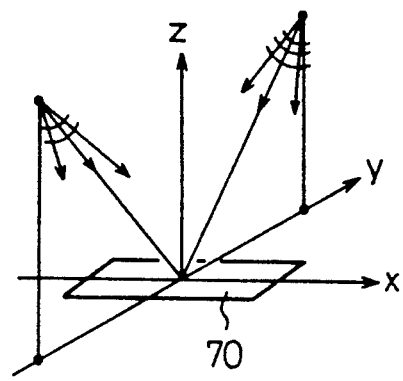
FIGS. 16A and 16B are diagrams views showing the preparation of an untwisted scanning line and a recreative optical system.
Figure 16B:
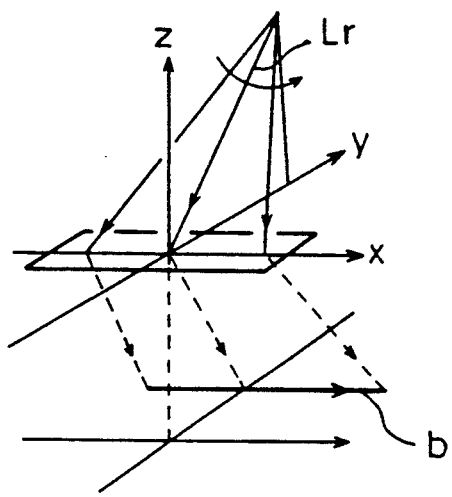

FIGS. 16A and 16B schematically show the way of forming the hologram H2 that produces the untwisted scanning line b, and recreating the line b. First, in a forming system, a hologram dry plate 70 is irradiated with two spherical waves (reference light and object light) coming in the direction of an axis y (in the plane of the hologram dry plate). Interference exposure by the waves forms the hologram H2. When a recreation beam Lr is emitted from a spot light source of the reference light, which is one of the holograms forming light, toward the hologram H2, the untwisted diffraction beam b is recreated (FIG. 16B).

Figure 17A:
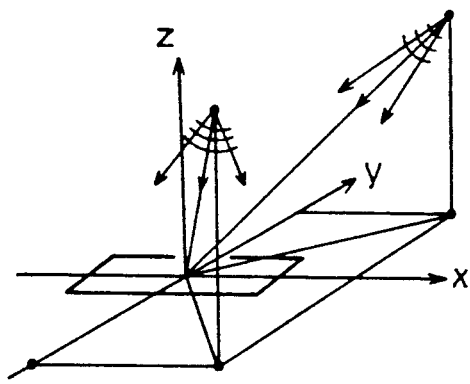
FIGS. 17A and 17B are diagrams showing the preparation of a twisted scanning line and a recreative optical system.
Figure 17B:
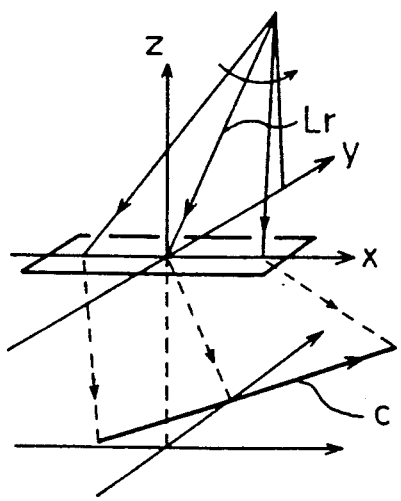

FIGS. 17A and 17B show optical systems for forming and recreating the twisted scanning lines a and c. As shown in FIG. 17A, the spot light source for the forming waves is simply shifted in a direction x in a forming process of a hologram. When the recreation beam Lr is made incident on the hologram in the direction y similar to FIG. 16B, the diffraction light is twisted to provide the twisted scanning line c (or a) as shown in FIG. 17B. Alternatively, as is well known, wavelengths of the forming waves and recreation wave may be made different from one other to cause a chromatic aberration with which the twisted scanning lines are formed.

According to the embodiment mentioned above, a plurality of holograms are employed in a simple and compact structure to form multidirectional scanning line patterns which can improve the quality of a bar code reading operation.

Namely, a scanning beam from the scanning optical system incorporated in the substrate is propagated in parallel with the light guide plate and externally emitted from the emission portion in predetermined directions. At this time, a plurality of the holograms arranged at the emission portion diffract respective scanning beams in directions determined by the respective holograms, thereby easily crossing the scanning lines with one another. The number of the scanning lines can be easily increased by increasing the number of the holograms arranged at the emission portion, thereby realizing, without an increase of the overall size, a laser scanner that reads bar codes without error.

FIGS. 18 to 25 show embodiments having a further improved laser beam utilization factor.

According to the above embodiments employing the transparent light guide plate, a beam is propagated inside the stand (transparent light guide plate), and only a part of the scanning beam entering the stand is effectively used for reading bar codes. Namely, the utilization efficiency of the scanning beam is not always satisfactory.

For example, in the embodiment shown in FIGS. 12 and 13, the laser beam P emitted from the laser source 41 is guided by the polygonal mirror 31 from A1 to B1, from A2 to B2, and from A3 to B3 (refer to FIG. 25(D)) to provide beams, which enter the lower part of the transparent stand portion 23, are propagated inside the transparent stand portion by repetitive total reflection, and made incident on the upper hologram windows H1, H2, and H3, respectively.

Respective surfaces 31a, 31b, and 31c of the polygonal mirror 31 have different inclinations, so that the beam reflected by the respective surfaces provides beams indicated with reference marks Pa, Pb, and Pc in FIG. 13.

The scanning beam Pa travels toward the hologram window H1, exits therefrom, and travels obliquely as indicated with a reference mark D1 (the scanning line a).

The scanning beam Pc travels toward the hologram window H3, exits therefrom, and travels obliquely opposite to the direction D1 as indicated with a reference mark D3 (the scanning line c).

The scanning beam Pb travels toward the hologram window H2, exits therefrom, and travels horizontally as indicated with a reference mark D2 (the scanning line b). The scanning line b is in parallel with the plane of the transparent light guide plate 23.

Due to the rotation of the polygonal mirror 31, the above operation is repeated to read a bar code.

As shown in FIG. 12, the scanning width of a beam widens while the beam is propagated upwardly inside the transparent light guide plate 23.

Figure 25:
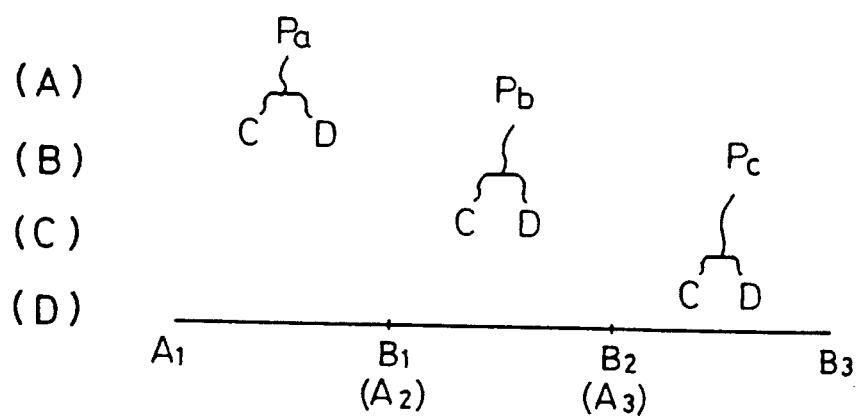
FIG. 25 is a diagram for explaining a utilization factor of a beam and a formation of a pattern in the scanner of FIG. 12.

Accordingly, within the scanning width A1-B1 at the incident portion of the transparent light guide plate 23, only a central part indicated with C-D is used for reading a bar code (refer to FIG. 25). Namely, the utilization efficiency of the beam is poor. Namely, a scanning line of the small width C-D is widened to the full width of the window (the width of the hologram).

In addition, each of the vertical, horizontal, and oblique scanning patterns requires a one time scanning, so that, as apparent in FIG. 25, three scanning operations of A1 to B1, A2 to B2, and A3 to B3 are needed. This means that the polygonal mirror 31 needs three surfaces, which lowers the performance of the scanner.

To improve the utilization efficiency of the laser beam, a laser beam scanning line dividing means is arranged inside the transparent light guide plate 23. This dividing means deflects the laser beam portions which usually are not used, toward the respective hologram emission windows, thereby improving the utilization efficiency of laser beam.

The laser beam scanning line dividing means can form a set of vertical, horizontal, and oblique bar code reading patterns in a short time.

Figure 18:
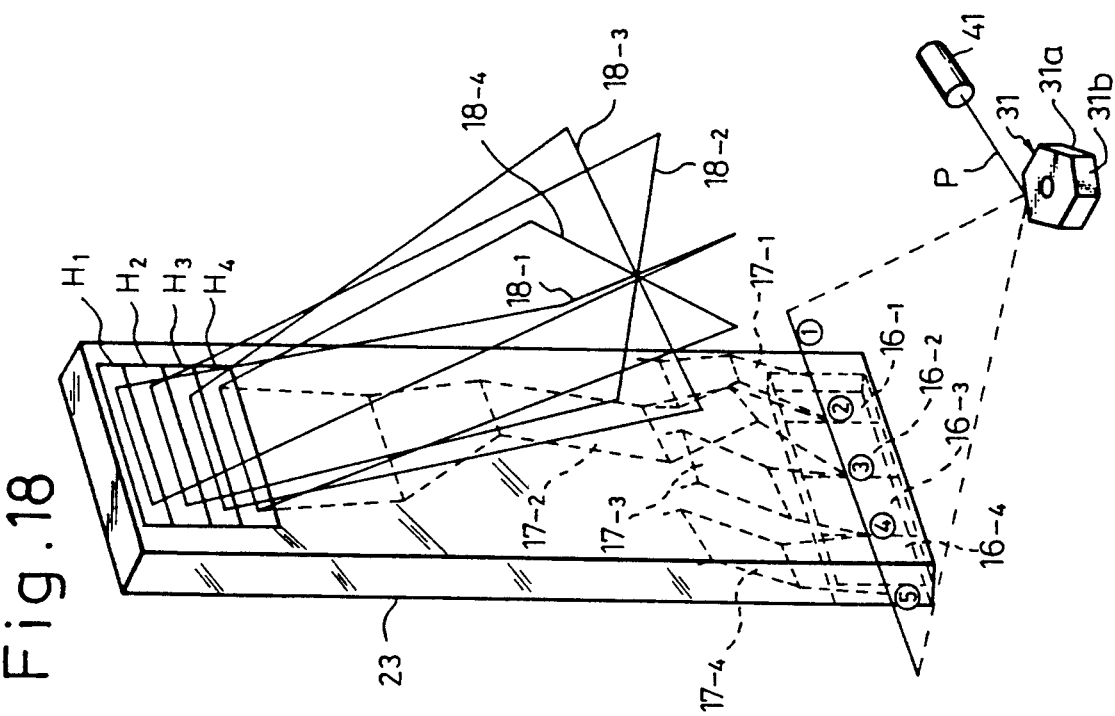
FIG. 18 is a view showing a stand type scanner for a bar code reader according to still another embodiment of the present invention.

FIG. 18 shows an embodiment of a stand type scanner for a bar code reader, having the scanning line dividing means.

A numeral 31 denotes a polygonal mirror, and 41 a laser source for repeatedly providing a laser beam P from (1) to (5).

The polygonal mirror 31 has surfaces 31a, 31b, 31c, . . . having an identical inclination to guide the laser beam P on the same locus from (1) to (5).

Numeral 23 denotes a transparent light guide plate made of a transparent glass plate arranged upright. A lower part of the light guide plate agrees with the locus of the laser beam P.

An upper part of the light guide plate 23 has four rows of emission hologram windows H1 to H4.

Numerals 16-1 to 16-4 denote reflection type holograms arranged at the lower part of the light guide plate 23 along the locus of the laser beam to form the laser beam dividing means.

The holograms 16-1 to 16-4 have different optical characteristics respectively. The hologram 16-1 deflects the laser beam P toward the hologram window H1 as indicated with a reference mark 17-1 (FIG. 20(A)).

Figure 20A:
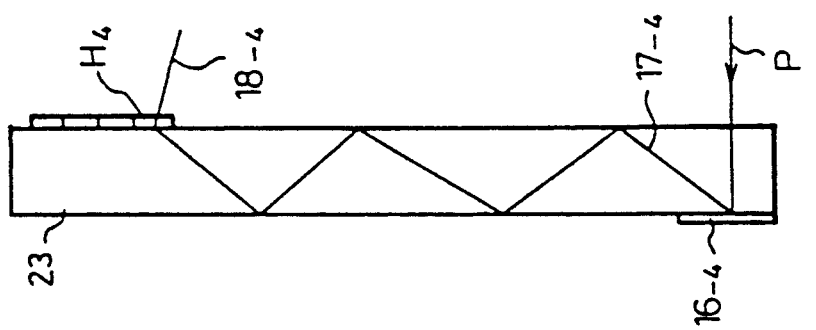
FIG. 20 is a view showing the propagation, in the stand, of each divided laser beam of FIG. 19.
Figure 20B:
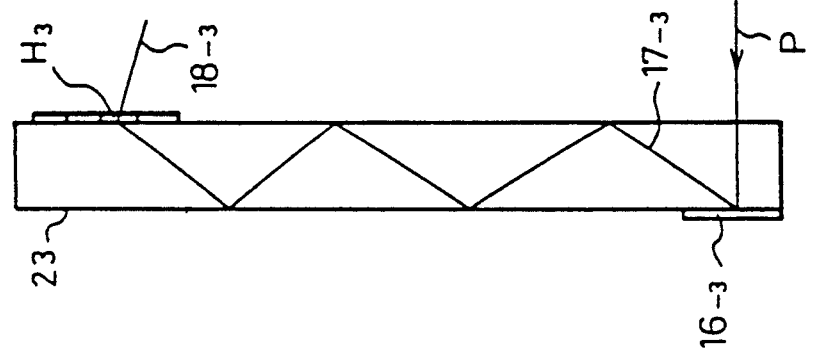

The hologram 16-2 deflects the laser beam P toward the hologram window H2 as indicated with a reference mark 17-2 (FIG. 20(B)).

Figure 20C:
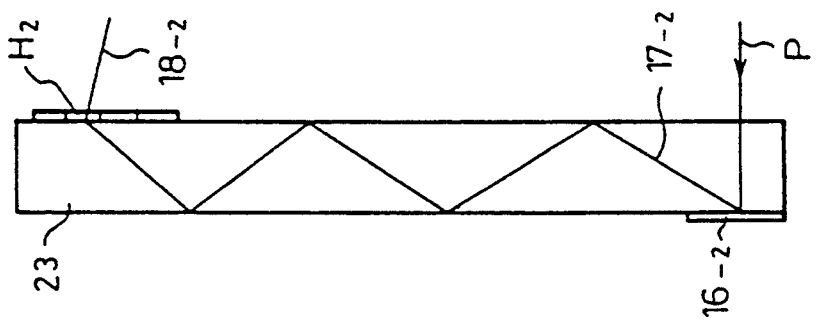

The hologram 16-3 deflects the laser beam P toward the hologram window H3 as indicated with a reference mark 17-3 (FIG. 20(C)).

Figure 20D:
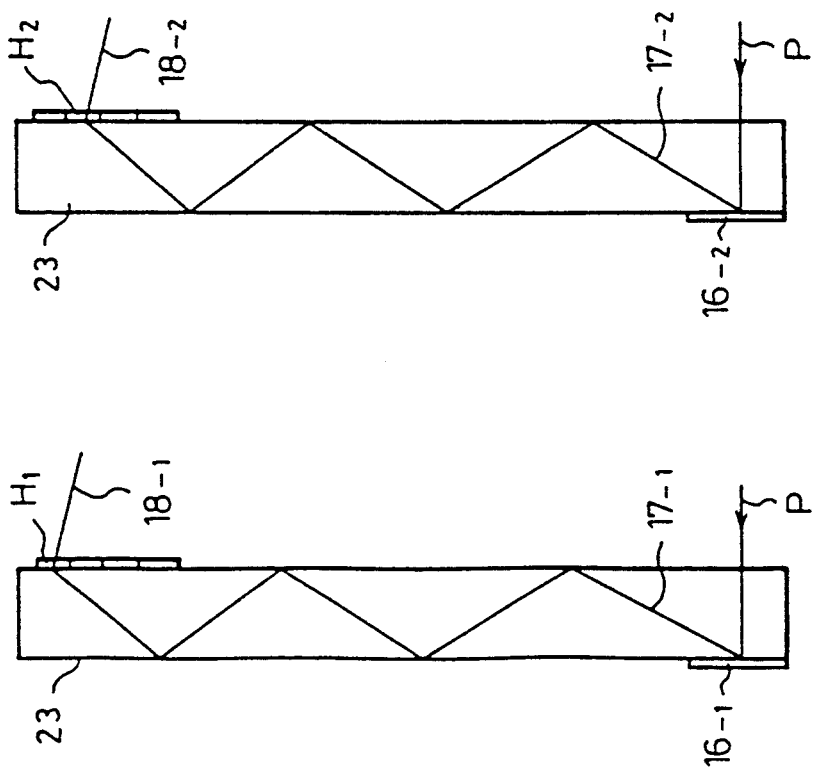

The hologram 16-4 deflects the laser beam P toward the hologram window H4 as indicated with a reference mark 17-4 (FIG. 20(D)).

The hologram windows H1 to H4 have optical characteristics to vertically, horizontally, and obliquely diffract the laser beams 17-1 to 17-4 as indicated with reference marks 18-1 to 18-4 in FIG. 18.

Figure 21:
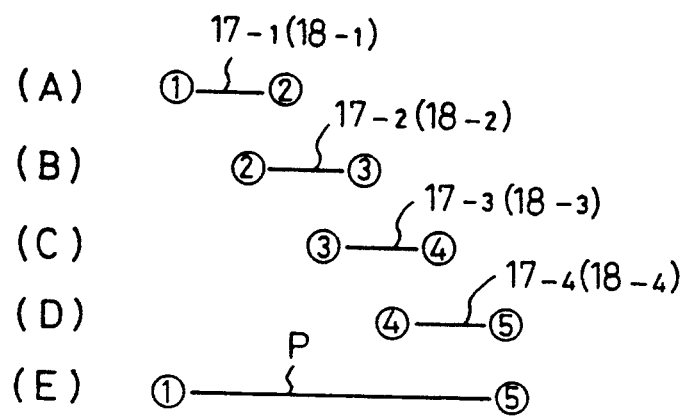
FIG. 21 is a diagram for explaining a utilization factor of a laser beam and a formation of a pattern.

As shown in FIG. 21, when the laser beam P is once guided at the lower part of the light guide plate 23 from (1) to (5), the hologram 16-1 diffracts the beam in the section from (1) to (2) to provide the laser beam 17-1, which repeats a total reflection in the light guide plate 23 and reaches the hologram window H1, which diffracts the laser beam to provide the scanning laser beam 18-1.

In the section from (2) to (3), the hologram 16-2 diffracts the beam to provide the laser beam 17-2, which is diffracted by the hologram window H2 to form the scanning beam 18-2.

In the section from (3) to (4), the hologram 16-3 diffracts the beam to provide the laser beam 17-3, which is diffracted by the hologram window H3 to form the scanning beam 18-3.

In the section from (4) to (5), the hologram 16-4 diffracts the beam to provide the laser beam 17-4, which is diffracted by the hologram window H4 to form the scanning beam 18-4.

As apparent from the above, when the laser beam P travels from (1) to (5), the beam is divided into the four laser beams 17-1 to 17-4, which become the laser beams 18-1 to 18-4 emitted from the respective hologram windows and used to read a bar code, thereby further improving the utilization efficiency of the laser beam P.

A set of the vertical, horizontal, and oblique patterns 18-1 to 18-4 is formed by one scan of the laser beam P from (1) to (5) by a single surface of the polygonal mirror 31. This can shorten the time required for forming the set of the patterns, to thereby improve the performance of the scanner.

Figure 19:
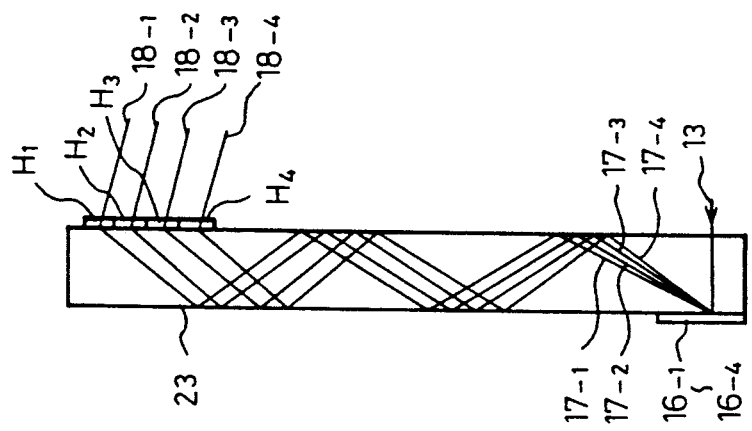
FIG. 19 is a view explaining the division and propagation of a laser beam in the stand of FIG. 18.
Figure 22:
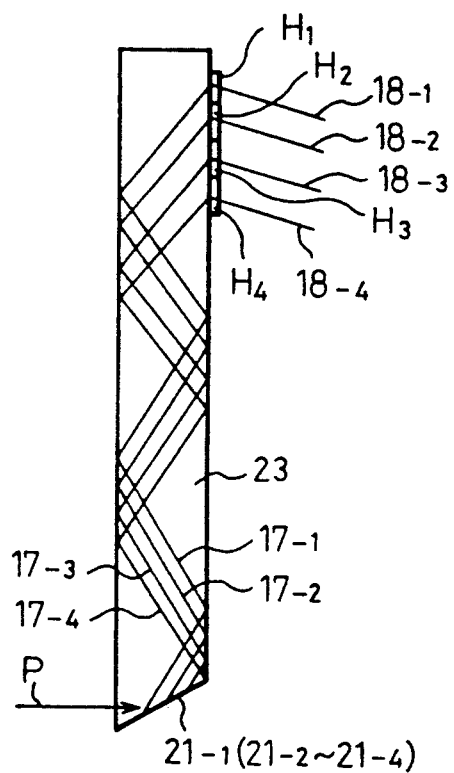
FIG. 22 is a view showing a stand portion of a scanner of another embodiment, based on FIG. 18.
Figure 23:
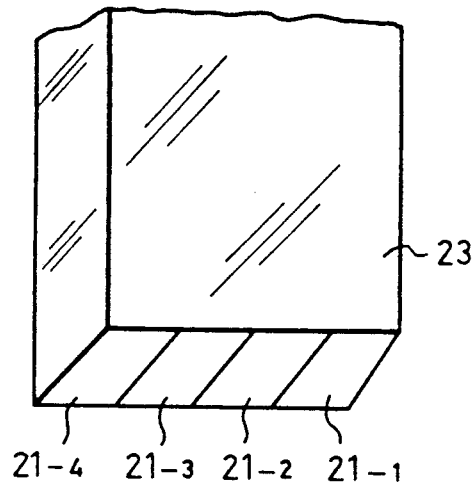
FIG. 23 is a view showing the bottom of the stand portion of FIG. 22.

FIGS. 22 and 23 show another embodiment different from the one shown in FIGS. 18 and 19. In the figures, parts corresponding to those of FIGS. 18 and 19 are represented with like reference marks.

A transparent light guide plate 23 has, on its lower surface, four divided reflection surfaces 21-1 to 21-4 having different inclinations.

While a laser beam P is being moved from (1) to (5), the reflection surfaces 21-1 to 21-4 reflect the laser beam, and the reflected beams are propagated, similar to the laser beams 17-1 to 17-4, inside the light guide plate 23 toward emission hologram windows H1 to H4.

Figure 24:
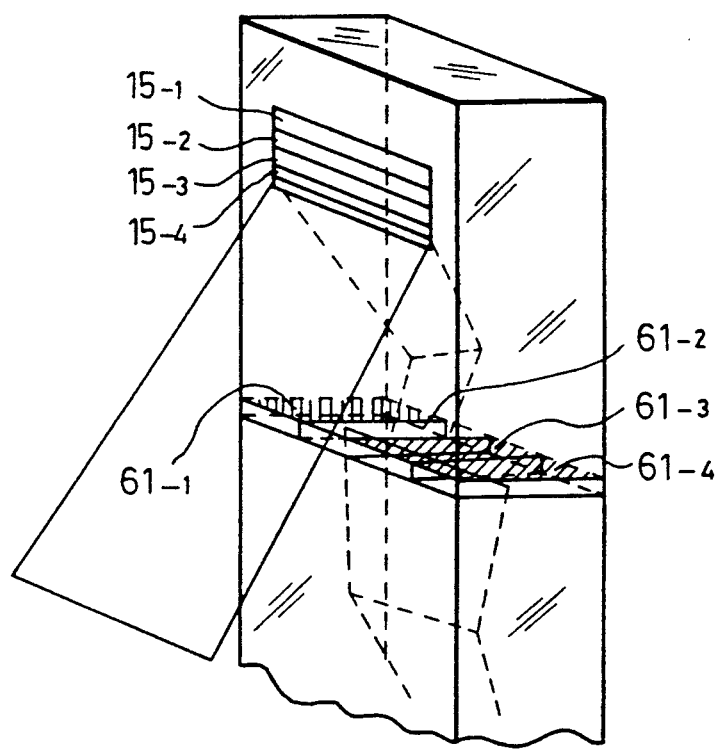
FIG. 24 is a view showing a stand portion of a scanner based on still another embodiment of FIG. 18.

FIG. 24 shows still another embodiment.

A transparent light guide plate 23 has, at its intermediate portion, four transmission type holograms 61-1 to 61-4 having different diffraction characteristics and arranged side by side in a scanning direction.

A laser beam propagated from a lower part inside the light guide plate 23 sequentially scans the holograms 61-1 to 61-4, which diffract the laser beam in predetermined directions, thereby dividing the laser beam into four beams. The divided four laser beams are emitted from respective emission hologram windows H1 to H4.

As explained above, according to the embodiments shown in FIGS. 18 to 24, a single scanning laser beam provided by a laser beam scanning means is divided into a plurality of scanning laser beams, which are directed toward emission hologram windows for emitting the divided laser beams in different directions. This arrangement can improve the utilization efficiency of laser beam scanning lines when reading bar codes.

Namely, the embodiments can form a set of vertical, horizontal, and oblique scanning patterns for reading bar codes in a short time, to thereby improve the performance of the bar code reader.

FIGS. 26 to 32 show embodiments each having a common substrate incorporating a laser scanning portion, for emitting various scanning patterns from a light emission window 25 depending on the use.

For symbols (bar codes) of standard size according to UPC/EAN/JAN codes in a POS system, a bar code B on a commodity is easily read with orthogonal two scanning patterns. The two scanning patterns can perform a reading operation in any direction. If there is only one scanning line, the scanning line may not completely cross the bar code depending on the orientation of the commodity (and thus of the bar code) as handled by an operator, and the bar code may not be read. This problem becomes bigger as the bar code becomes smaller. For example, reading a short (truncate) symbol may require at least three to five multidirectionally crossing scanning patterns.

Bar codes used in a physical distribution such as those based on Code 39, Interleaved 2 out of 5, have low information density and no limitation in the number of digits, and thus are extremely long laterally. For this kind of bar code, the orthogonal patterns or the equiangular crossing patterns oriented in three to five directions are incapable of carrying out the multidirectional reading operation, and it is necessary to adjust the angle of the bar code when reading the same.

In this way, it is generally necessary to change scanning patterns from one to another, depending on the use and location.

The embodiments shown in FIGS. 26 to 32 can satisfy such requirements. A diffracted direction of an outgoing beam from a light emission window is uniquely determined by a hologram, so that the diffracted direction cannot be changed without changing (i.e., preparing again) the design of the hologram.

Figure 26:
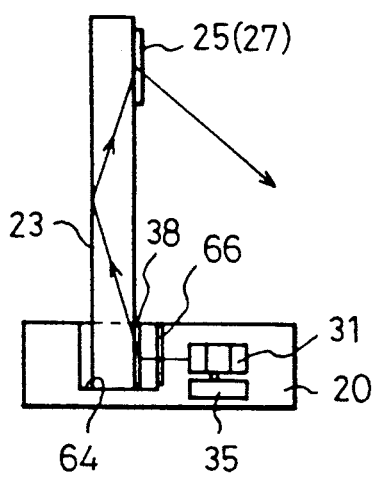
FIG. 26 is a side view showing a basic arrangement of a laser scanner according to another embodiment of the invention.
Figure 27:
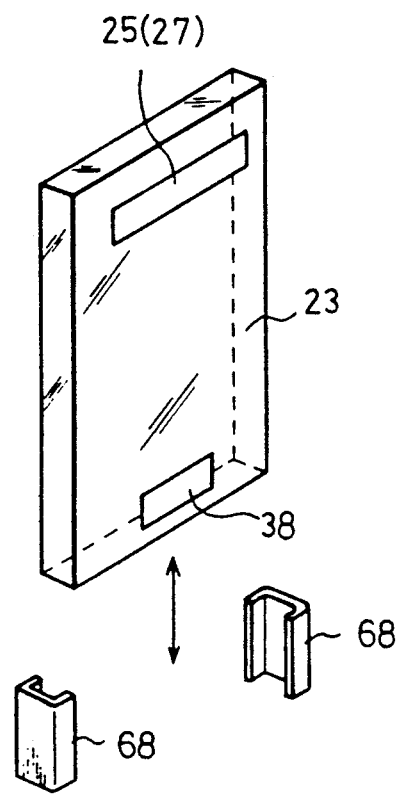
FIG. 27 is an enlarged and exploded perspective view of FIG. 26.

FIGS. 26 and 27 show a basic arrangement of an embodiment of a laser scanner having an exchangeable transparent light guide plate 23. In the figures, the transparent light guide plate 23 is removably fitted on a substrate 20. A hologram 27 for forming a scanning beam emission window 25 is arranged at an upper part of the transparent light guide plate 23. The hollow substrate 20 incorporates a scanning optical system having a polygonal mirror 31 rotated by a motor 35. According to the rotation, the polygonal mirror 31 guides a beam in a plane of the substrate 20. A scanning beam introducing hologram 38 formed at a lower end of the transparent light guide plate 23 diffracts the beam upward into the transparent light guide plate 23. The scanning beam inside the transparent light guide plate 23 undergoes repeated total reflections, and as shown in the figures, is diffracted by and emitted from the emission window 25 (hologram 27) in a predetermined direction. An incident direction toward the transparent light guide plate 23 and an outgoing direction from the transparent light guide plate 23 are optionally set by properly designing pitches of interference fringes of the holograms 27 and 38. The substrate 20 has recesses 64 for removably receiving the transparent light guide plate 23. The recesses 64 are fixedly provided with guides 68 (FIG. 27) for easily fitting and removing the transparent light guide plate 23 in a sliding manner in a vertical direction. The guides 68 may be a pair of facing channel-shaped groove members as shown in the figure.

A sealing window glass 66 for preventing water, dust etc., from entering the inside of the substrate 20 is arranged at a part of the substrate 20 facing the introducing hologram 38 of the transparent light guide plate 23.

FIGS. 28 to 31 show several examples of the transparent light guide plate 23, having various holograms (emission portions) 27. Each of the examples has three holograms 27 (H1, H2, and H3) at an emission portion thereof to produce three scanning patterns.

Figure 28:
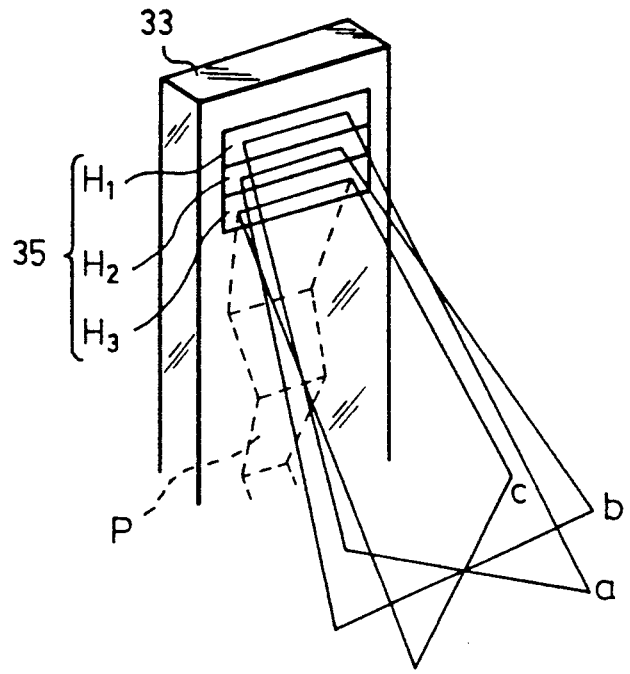
FIGS. 28 to 31 are respectively showing four different examples of exchangeable light guide plates for achieving various scanning line patterns.

A scanning beam P from the polygonal mirror 31 is propagated upwardly and in parallel relationship with respect to, the inside of the transparent light guide plate 23 due to repetitive total reflections. The respective holograms H1, H2, and H3 receive the coherent scanning lines, and provide beams in respective diffraction directions (corresponding to scanning lines a, b, and c) as shown in FIG. 28. Here, as shown in FIG. 28, the middle hologram H2, for example, does not twist the scanning direction of the beam by diffraction and provides the scanning beam b that is in parallel with the incident scanning beam. On the other hand, the holograms H1 and H2 twist the incident beams by diffraction and provide the scanning lines a and c. Namely, the scanning lines a, b, and c form three scanning patterns crossing one another. In this way, the unidirectional scanning beam (coherent scanning beam) inside the transparent light guide plate 23 is converted by the holograms H1, H2, and H3 into the scanning patterns of three directions crossing one another. The number of the scanning lines may be infinitely increased in theory, by increasing the number of the holograms.

The scanning beam P is coherently separated by slightly changing the reflection surfaces of the polygonal mirror 31, thereby easily forming the coherent incident scanning beams for the holograms H1, H2, and H3 respectively. This embodiment is suitable for reading UPC system bar codes.

Figure 29:
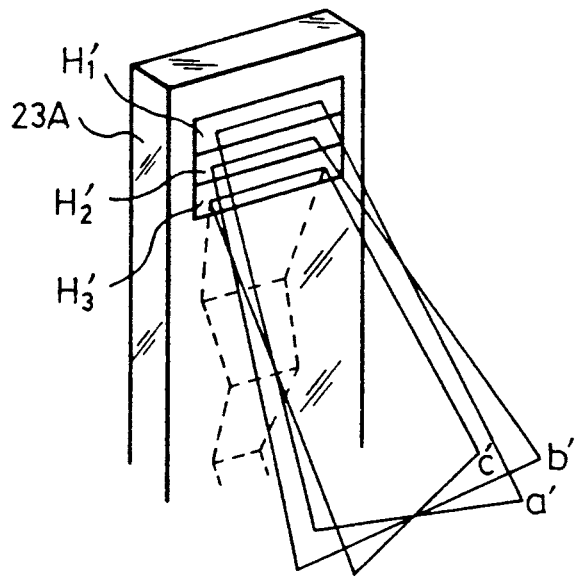

FIG. 29 shows another embodiment. In the figure, a transparent light guide plate 23A has holograms H1', H2' and H3' which produce scanning patterns a', b', and c' having smaller crossing angles than those shown in FIG. 28. This embodiment is suitable for, for example, a bar code having an extremely long lateral length (with short height) which cannot be read by the scanning patterns of FIG. 28. The patterns having the small crossing angles can extend margins for adjusting the angle of a bar code.

Figure 30:
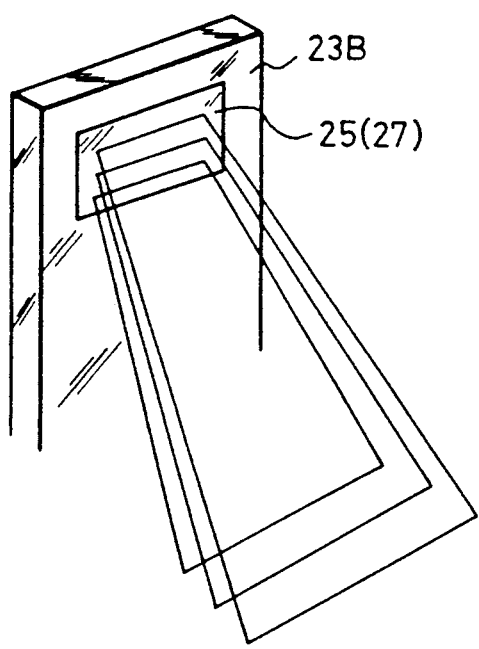

FIG. 30 shows a transparent light guide plate 23B having an emission portion 25 provided with a single hologram 27. in this case, a diffraction direction shifts in parallel depending on an incident position on the hologram 27, thereby forming separated parallel positiioning margin when reading extremely wide codes such as those based on Code 39 or Interleaved 2 out of 5.

As explained above, the transparent light guide plates 23 (FIG. 28), 23A (FIG. 29), and 23B (FIG. 30) can be exchanged one for the other, depending on the conditions of the commodities and sales points, to provide required scanning patterns.

Figure 31:
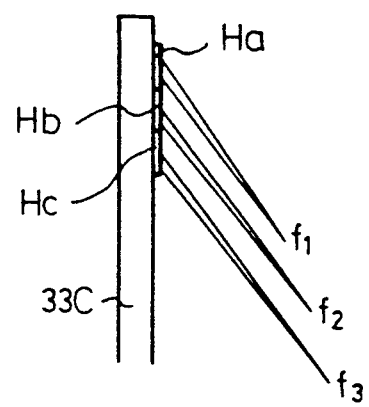

FIG. 31 shows an embodiment that can cope with the size of a commodity. This embodiment employs a transparent light guide plate 23C having holograms Ha, Hb, and Hc which have different focal lengths f1, f2, and f3, respectively, thereby substantially expanding the reading regions (depths).

Figure 32:
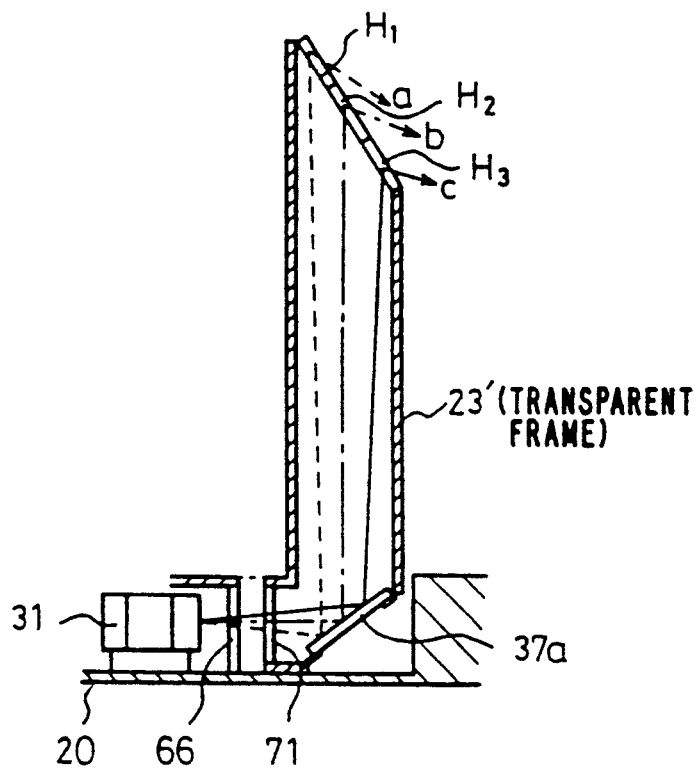
FIG. 32 is a view explaining another embodiment of FIG. 26.
Figure 33:
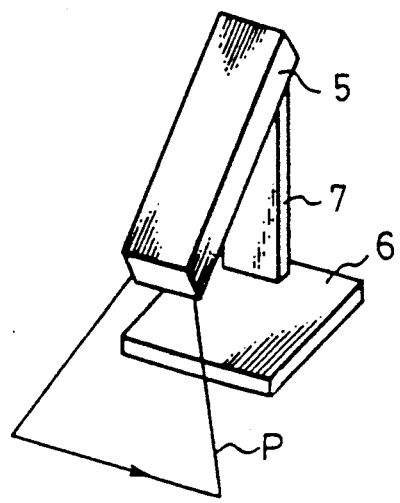
FIG. 33 is a perspective view showing a stand type laser scanner according to a prior art.

In each of the above embodiments, the transparent light guide plate 23 has the emission portion 25 formed of holograms. As shown in FIG. 32, the transparent light guide plate 23 need not be used, but instead, a hollow support (frame) 23' may be used. The hollow support has, at its lower end, a reflection mirror 41 for upwardly guiding an incident beam from a polygonal mirror 31, and at its upper end, inclined holograms H1, H2, and H3. (This embodiment is identical to the embodiment of FIG. 14.) In this case, the hollow support 23, has a sealing window 71 which faces a sealing window glass 66 of the substrate 20. Diffraction directions (outgoing directions) can be optionally set according to the designs of the holograms H1, H2, and H3. Similar to FIG. 14, the holograms H1, H2, and H3 may be formed as a unit on a single glass base. In the embodiment of FIG. 32, the hollow support 23' having the sealing window glass 66, mirror 37a, and holograms H1, H2, and H3 forms an exchangeable unit.

As explained above, according to the embodiments of FIGS. 26 to 32, the light guide plate 23 (23A, 23B, 23C) or the frame 23, having a light emission window of a specific purpose is removably fitted to the common substrate 20 to easily provide various scanning patterns without changing the scanning optical system.

The present invention is effectively applicable for a POS system employed for registers of supermarkets, department stores, and other specialty stores.

We claim:

1. A laser scanner for a bar code reader comprising a laser source, a laser beam scanning means for scanning a bar code on an object to be detected with a laser beam emitted from the laser source in a predetermined direction, a light emission window through which the scanning laser beam is emitted toward the bar code on the object, and an optical detecting means for detecting a signal light reflected from the object, characterized in that the laser beam scanning means and the optical detecting means are integrally incorporated in a common substrate and the light emission window is supported on the substrate by a transparent support, the transparent support being angularly displaced from the substrate so as to protrude from the substrate.

2. A laser scanner according to claim 1, wherein the laser source is integrally incorporated in the substrate.

3. A laser scanner according to claim 1, wherein said laser source is a semiconductor laser.

4. A laser source as recited in claim 1 wherein the transparent support protrudes from the substrate in a direction generally perpendicular to the substrate.

5. A laser scanner for a bar code reader comprising a laser source, a laser beam scanning means for scanning a bar code on an object to be detected with a laser beam emitted from the laser source in a predetermined direction, a light emission window through which the scanning beam is emitted toward the bar code on the object, and an optical detecting means for detecting a signal light reflected from the object, characterized in that the laser beam scanning means and the optical detecting means are integrally incorporated in a common substrate and the light emission window is supported on the substrate by a transparent support, said transparent support comprising a light guide plate through which the outgoing laser beam and the returning signal light are propagated.

6. A laser scanner according to claim 5, wherein light guide plate extends transversely to the substrate and has a lower end adjacent the substrate and an upper end remote from the substrate and said light emission window is provided on the upper end of the light guide plate.

7. A laser scanner according to claim 6, wherein said light emission window has a hologram provided thereon to diffract the laser beam to a predetermined direction.

8. A laser scanner according to claim 6, further comprising an upper reflection mirror provided on the upper end of the light guide plate to reflect the laser beam, transmitted through the light guide plate, in a predetermined direction toward the bar code on the object from the light emission window.

9. A laser scanner according to claim 6, further comprising a lower reflection means for reflecting the laser beam into and for propagation through, the light guide plate toward the light emission window.

10. A laser scanner according to claim 9, wherein said lower reflection means comprises a lower reflection mirror provided in the substrate and which reflects the laser beam into the light guide plate.

11. A laser scanner according to claim 9, wherein said lower reflection means comprises a lower oblique surface formed on the lower end of the light guide plate.

12. A laser scanner according to claim 9, wherein said lower reflection means comprises a hologram provided at the lower end of the light guide plate and which diffracts the laser beam into, and for propagation through, the light guide plate toward the light emission window.

13. A laser scanner according to claim 9, wherein said laser beam scanning means comprises a rotatable polygonal mirror having reflection surfaces which respectively reflect the laser beam, emitted from the laser source and incident thereon, as corresponding laser beams into, and for propagation through, the light guide plate.

14. A laser scanner according to claim 13, further comprising a concave mirror which reflects the signal light incident thereon, as reflected from the bar code of the object, toward the optical detecting means.

15. A laser scanner according to claim 14, wherein said concave mirror has a pin hole through which the outgoing light from the laser source is permitted to pass.

16. A laser scanner according to claim 9, wherein said laser beam scanning means comprises a galvano mirror.

17. A laser scanner in a bar code reader for reading a bar code presented on an object and having a source of a laser beam and a laser beam scanning means for receiving the laser beam as emitted from the laser beam source, and scanning the bar code with the received laser beam and further including an optical detecting means for receiving, and detecting, a signal light beam produced by the reflection, by the bar code, of the scanning laser beam as incident thereon, comprising:

a substrate, said laser beam scanning means and said optical detecting means being incorporated within the substrate;

a transparent light guide plate, disposed relatively to the substrate so as to be angularly displaced therefrom, having a lower end adjacent the substrate and an upper end remote from the substrate, the laser beam scanning means directing the scanning laser beam into the lower end of the light guide plate so as to propagate through the light guide plate to the upper end thereof plate from the upper to the lower end thereof; and an emission window on the upper end of the light guide plate which receives the scanning laser beam, as propagated through the light guide plate, and emits same toward the bar code so as to be incident thereon and thereby for scanning the bar code with the scanning laser beam.

18. A laser scanner as recited in claim 17 wherein the light guide plate is generally transversely, angularly displaced relatively to the substrate.

19. A laser scanner according to claim 17, wherein said light emission window has a hologram provided thereon so as to diffract the laser beam in a predetermined direction.

20. A laser scanner according to claim 17, further comprising an upper reflection mirror provided on the upper end of the light guide plate so as to reflect the laser beam, propagated through the light guide plate, in a predetermined direction toward the bar code on the object from the light emission window.

21. A laser scanner according to claim 17, further comprising a lower reflection means for reflecting the laser beam into, and for propagating through, the light guide plate toward the light emission window.

22. A laser scanner according to claim 21, wherein said lower reflection means comprises a lower reflection mirror provided in the substrate and which reflects the laser beam into the light guide plate.

23. A laser scanner according to claim 21, wherein said lower reflecting means comprises a lower oblique surface formed on the lower end of the light guide plate.

24. A laser scanner according to claim 21, wherein said lower reflection means comprises a hologram provided at the lower end of the light guide plate and which diffracts the laser beam into, and for propagation through, the light guide plate toward the light emission window.

25. A laser scanner according to claim 17, wherein said laser beam scanning means comprises a rotatable polygonal mirror having reflection surfaces which respectively reflect the laser beam, emitted from the laser source and incident thereon, as corresponding laser beams into, and for propagation through, the light guide plate.

26. A laser scanner according to claim 17, further comprising a concave mirror which reflects the signal light beam incident thereon, as refleced from the bar code of the object, toward the optical detecting means.

27. A laser scanner according to claim 26, wherein said concave mirror has a pin hole through which the outgoing light from the laser source is permitted to pass.

28. A laser scanner according to claim 17, wherein said laser beam scanning means comprises a galvano mirror.

* * * * *

UNITED STATES PATENT AND TRADEMARK OFFICE
CERTIFICATE OF CORRECTION

PATENT NO. : 5,266,788
DATED : November 30, 1993
INVENTOR(S) : YAMAZAKI et al.

It is certified that error appears in the above-indentified patent and that said Letters Patent is hereby corrected as shown below:

Title page, item : [56] References Cited, in col. 2, between lines 7 and 8, insert --5,115,122 5/1992 Jwo et al............235/467--;
        col. 2, under Foreign Patent Documents between lines 7 and 8, insert --3-167684  7/1991  Japan--.

Col. 3,    line 12, after "counter" insert --,--;
              line 24, delete "views";
              line 44, change "of" to --, based on--;
              line 53, after "are" insert --views--.

Col. 4,    line 12, after "operator" insert --,--;
              line 18, after "31" insert --,--;
              lines 46-48, delete ", on the surface thereof opposite to the surface thereof disposed toward the commodity,";
              line 49, after "23" insert --, on the surface thereof opposite to the surface thereof disposed toward the commodity,--;
              line 53, after "23a" insert --,--;
              line 54, after "directly" insert --,--.

Col. 5,    line 18, delete "holed";
              line 40, after "23" insert --,--; and after "path" insert --, and--;
              line 53, change "this" to --the--;
              line 54, change "the" to --this--;
              line 57, after "25" insert --,--; and after "27" insert --,--;
              line 65, change "rundergoes" to --undergoes--.

Col. 9,    line 43, after "portions" insert --,--;
              line 46, after "of" insert --the--.

Col. 10,    line 61, change "HI" to --H1--.

UNITED STATES PATENT AND TRADEMARK OFFICE
CERTIFICATE OF CORRECTION

PATENT NO. : 5,266,788
DATED : November 30, 1993
INVENTOR(S) : YAMAZAKI et al.

It is certified that error appears in the above-indentified patent and that said Letters Patent is hereby corrected as shown below:

Col. 11, line 23, change "orthogonal two" to --two orthogonal--.

Col. 12, line 23, after "upwardly" insert --,--;
line 64, after "parallel" insert --patterns. The embodiment of Fig. 30 can also extend a--.

Col. 13, line 31, change "window of" to --window for--.

Col. 14, line 7, after "wherein" insert --said--.

Signed and Sealed this

Twenty-ninth Day of November, 1994

Attest:

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,266,788
DATED : November 30, 1993
INVENTOR(S) : Yamazaki, et. al.

It is certified that error appears in the above-indentified patent and that said Letters Patent is hereby corrected as shown below:

Column 15, line 8, after "thereof" insert --and the signal light beam propogating through the light guide--.

Signed and Sealed this

Fourteenth Day of February, 1995

Attest:

BRUCE LEHMAN

*Attesting Officer*     *Commissioner of Patents and Trademarks*